Jan. 12, 1960         M. CLOUPEAU         2,920,527
METHOD OF AND APPARATUS FOR INCREASING OPTICAL EFFECTS
Filed May 21, 1956         3 Sheets-Sheet 1
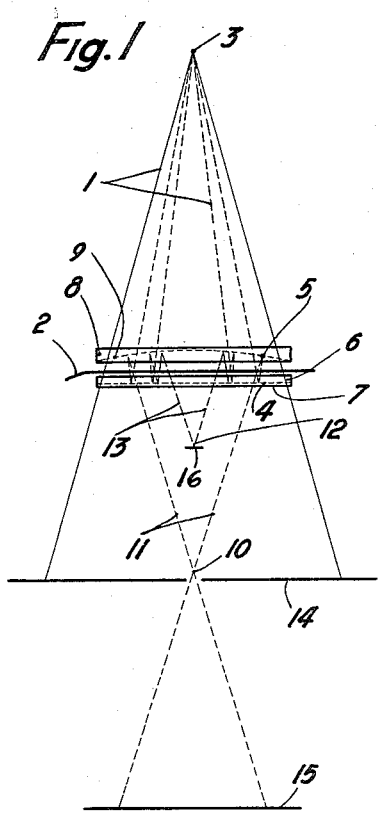
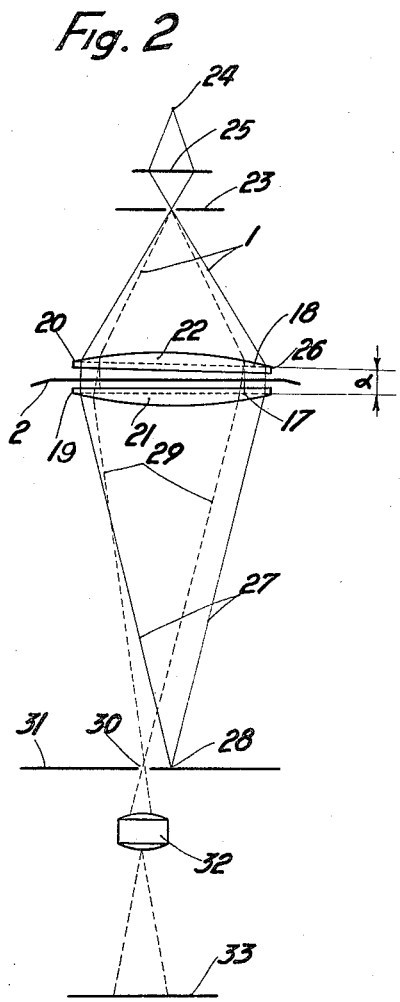
MICHEL CLOUPEAU
BY Allen & Allen
ATTORNEYS

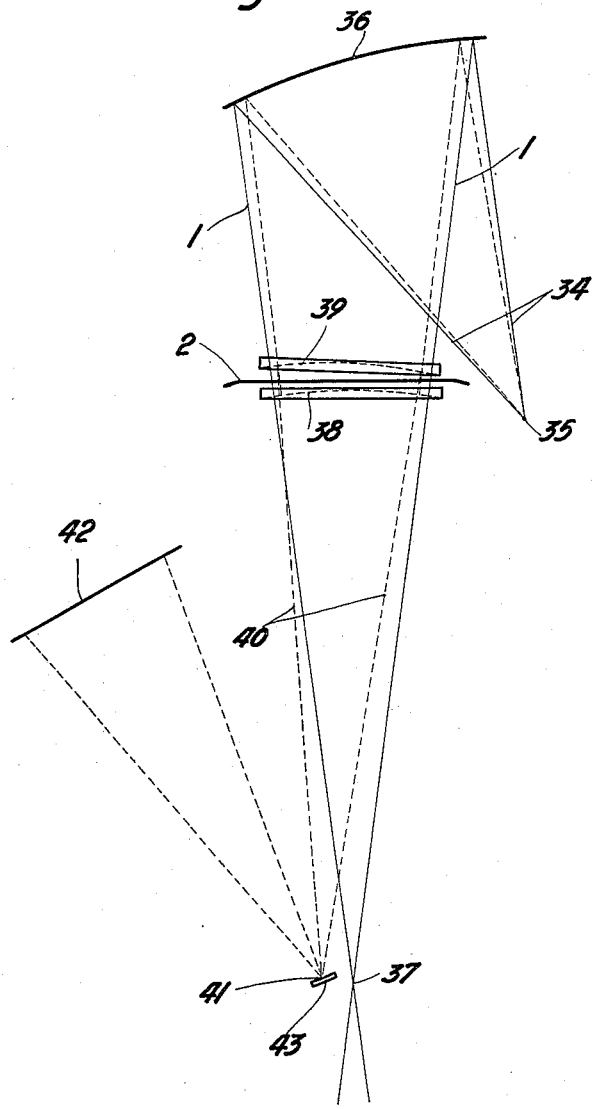

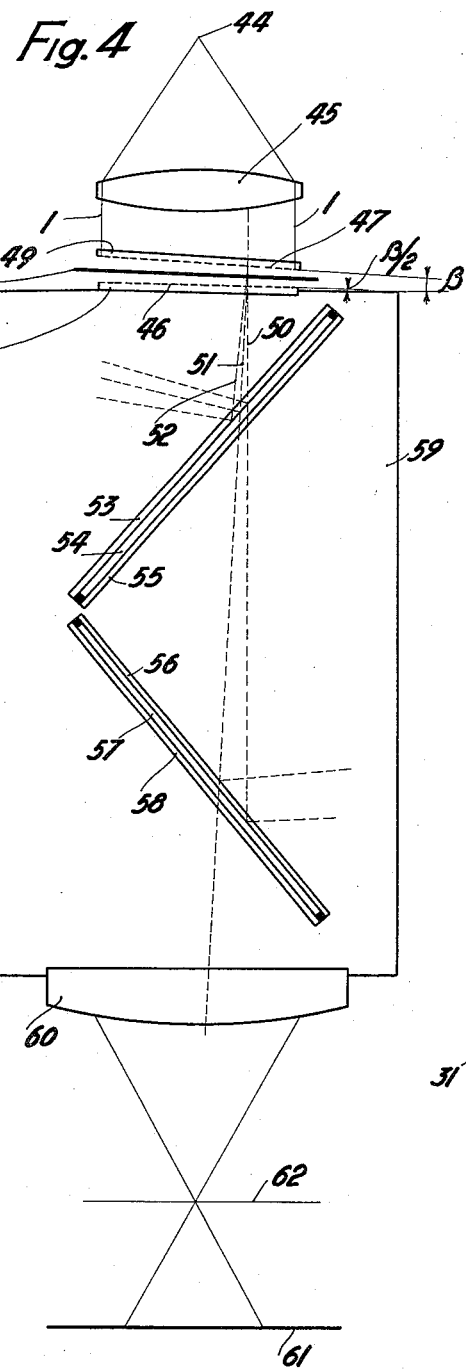
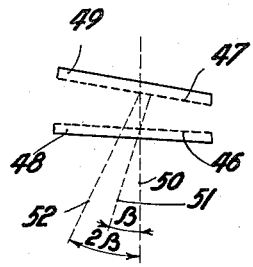
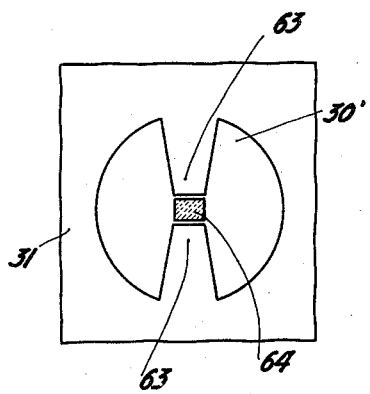
MICHEL CLOUPEAU
BY: Allen + Allen
ATTORNEYS

2,920,527

METHOD OF AND APPARATUS FOR INCREASING OPTICAL EFFECTS

Michel Cloupeau, Paris, France, assignor to Centre National de la Recherche Scientifique, Paris, France, a corporation of France Application May 21, 1956, Serial No. 586,009

Claims priority, application France May 25, 1955

9 Claims. (Cl. 88—24)

It is known that the optical effects (absorption, birefringence, etc.) of an object which can be observed by transparency, for example an under-exposed photographic film, can be increased by applying the object on a reflecting surface which returns towards the observer the illuminating light derived from a source located on the same side of the object as the observer. The optical effects are increased by reason of the fact that the light passes through the object twice.

However, this increase in the optical effects may be insufficient, and the principle of the invention consists in causing the light to pass through the object to be observed a number of times, greater than two, in such manner that each ray of light passes through the object each time at points which are very close together.

In order to increase the number of passages, the invention contemplates the placing of the object between two reflecting surfaces, of which at least one is a semi-reflecting surface. Thus the light before it reaches the receiver may be alternately reflected on the two reflecting surfaces, each reflection taking place between two passages of light through the object, so that the number of passages through the object exceeds the number of reflections by one unit.

As however at least one of the reflecting surfaces (that located on the same side as the receiver) must be semi-reflecting in order that the emergent light may pass through it, it is clear that this emergent light will be composed of various fractions of light, each of which has been subjected to different numbers of reflections (which are odd or even numbers, depending on whether the source of light and the observer are on the same side or on opposite sides of the optical system, the numbers of passages being on the contrary respectively even or odd).

The invention is based on the fact that if the observer sees simultaneously the light which has effected different numbers of passages, the gain in contrast is small and the composition of the light waves may give rise to interferences which would constitute a parasitic effect. It is for this reason that the invention has for its object to combine the multiple passage of the light through the object to be observed with means which permit of the selection at the receiver, from the emergent light, of a beam which has been subjected to a pre-determined number of reflections, whilst the beams which have been subjected to different numbers of reflections are eliminated either wholly or to a major extent.

In view of this result, the method in accordance with the invention consists on the one hand in illuminating from a source of light of small surface area the object to be observed, which is arranged between two reflecting surfaces which constitute, either by themselves or in combination with dioptric systems or mirrors, an optical system which sends the various beams in different directions or which focuses them at distinct points, and on the other hand to permit the passage or to send towards the receiver only that beam which has been subjected to the desired number of passages through the object; this selection of a beam may be obtained for example in the case in which the emergent beams are focussed, by eliminating the other beams by one or a number of suitably arranged screens, or by varying the direction of the single beam selected by means of a mirror.

The reflecting surfaces alone may ensure the formation of the images of the point source of light used; this is the case for example of two semi-reflecting surfaces comprising a flat surface on the side of the observer and a spherical surface on the opposite side.

The two reflecting surfaces may however provide the focusing of the beams at separate points only in combination with optical auxiliary elements (dioptric systems, mirrors): this is the case for example of two flat semi-reflecting surfaces forming a small angle between them and associated with an optical system which focusses the emergent beams. The non-parallelism of the flat mirrors has the effect of causing the focal point to be varied in dependence on the number of reflections to which the beams are subjected.

The selection of a beam may also be effected without previous focussing of the emergent beams; this is the case for example of two flat semi-reflecting surfaces forming a small angle between them and illuminated with parallel light: total-reflection prisms placed on the path of the emergent parallel beam enable those beams to be eliminated, of which the optical axes are located on opposite sides of the optical axis of the beam which it is desired to retain.

The reflecting surfaces which are in question above may be formed by reflecting layers deposited on a transparent support: a flat layer may be applied on a sheet with flat faces, whether parallel or not, or on the flat face of a plano-concave or plano-convex lens. A curved layer may be provided between the complementary faces of two plano-concave and plano-convex lenses of the same curvature, if the supporting surface of this layer is not required to play the part of a curved dioptric system for the transmitted light.

It is clear that the respective light intensity of the different images of the source (in the absence of the object), obtained in the manner explained above, will depend on the coefficient of reflection of the reflecting layers and, for the same coefficient of reflection, on the coefficient of absorption which varies with the nature of the layers. If for example one of the reflecting layers were simply constituted by the boundary or separating surface of two media having different indices, such as air and glass, the intensity of the beams which have passed through the object a number of times would be very low with respect to the intensity of the main beam.

The parasitic reflections of light which take place especially on the faces of the object studied or on the transparent sheets which would be placed over the reflecting layers in order to protect them, may be troublesome in certain cases. Several methods enable this light to be eliminated from the main beams: for example the surfaces of the protective sheets may be inclined with respect to the reflecting layers so that the images of the source given at the exit side of the system by the parasite beams are separate from the main images and may thus be eliminated; a liquid having the same index of refraction as the object or as the sheets may also be disposed between the object and the protective sheets of the reflecting layers; this method has the advantage of reducing the light which may in some cases diffuse the surface of the object studied and which, being admitted in part with the selected beam, is not in general negligible when it is desired to use a beam which has passed through the object a large number of times; finally, the immersion enables the effects to be attenuated of the refraction of the light rays due to the irregularities of thickness or of flatness of certain objects.

In order to assist in a better understanding of the invention, four particular examples of its embodiment will now be described, reference being made to the accompanying diagrammatic drawings which show the application of the invention to the observation or the printing of a photographic film, and which are views in diagrammatic cross-section taken along a plane passing through the axis of the illuminating beam:

In the case of Fig. 1: of a device employing two semi-reflecting surfaces of which one is spherical;

In the case of Figs. 2 and 4: of devices using two flat reflecting surfaces forming a small angle with each other;

In the case of Fig. 3: of a device employing two spherical semi-reflecting surfaces the axes of which form a small angle between them.

Figure 5 is a diagrammatic showing of one form of aperture which may be used in conjunction with the invention.

In order to simplify the description, it has been assumed that the parasitic reflections, diffusions and refractions have in all cases been rendered negligible by the methods which have already been referred to above.

In the four examples shown, it has been assumed that the incident light is a beam 1 of light coming from the opposite side of the film to be observed with respect to the observer. The result is that the emergent light (directed towards the bottom of the figures) has been subjected to an even number of reflections (0, 2, 4, etc.) and has passed through the film 2 an odd number of times (1, 3, 5, etc.). However, these particular conditions are not in any way to be interpreted as limitations.

In the arrangement shown in Fig. 1, the divergent beam 1 is emitted from a source 3 which is assumed to be practically a point. The film 2 is arranged between two semi-reflecting layers 4, 5; the layer 4 is a flat layer located on the side opposite to the source with respect to the film 2, that is to say on the side of the observer, whilst the layer 5 is a convex layer with respect to the source 3 intended to reflect towards the observer the light which has already been reflected at least once by the layer 4. The layer 4 is applied between two thin transparent sheets 6, 7 which parallel faces, whilst the layer 5 is mounted between the complementary curved faces of two plano-concave and plano-convex lenses 8, 9 having the same radius of curvature and the same index of refraction, the external faces of the assembly 8, 5, 9 being flat and parallel.

In these conditions, the fraction of light which passes through the device without reflection remains divergent light whilst the fraction of light which has been subjected to two reflections (one on each of the layers 4, 5) is focussed at the point 10 by convergence of the emergent rays 11 which have passed three times through the film 2, and whilst the fraction of light which has been subjected to four reflections (two on each of the layers 4, 5) is focussed at the point 12 by convergence of the emergent rays 13 which have passed five times through the film 2.

If, in accordance with the invention an opaque screen 14 is arranged as shown, with a small aperture at the point 10, almost the whole of the emergent beam having effected three passages is allowed to pass, and almost the whole of the beams which have effected a different number of passages are intercepted. The projection of the film 2 through which the light has passed three times can be observed on a screen 15. In the centre of the image, there will be a dark spot or a light spot, depending on wether a small opaque screen 16 has been placed below the point 12 or not.

Screens could also be arranged in such manner as to permit the passage only of the light which has effected for example five passages.

In the example shown in Fig. 2, the film 2 is arranged between two flat semi-reflecting layers 17, 18, placed respectively between one face of the thin transparent sheets 19, 20 and the flat face of the plano-convex lenses 21, 22. The small aperture (assumed for example to be rectangular) of the diaphragm 23 illuminated by the lamp 24 through the intermediary of the condenser 25, behaves as if it were practically a point source. It is placed in the focal plane of the plano-convex lens 22 on the optical axis of the lens 21. The reflecting layer 18 forms a small angle α with the layer 17.

In these conditions, the beam 26 transmitted by the assembly 22, 18, 20 is a parallel beam and the fraction of this beam transmitted by the assembly 19, 17, 21, is a beam 27 convergent at the point 28 located in the focal plane of the plano-convex lens 21. The fraction of the beam 26 which is reflected by the layer 17 and then by the layer 18 also forms a parallel beam, the direction of which however makes an angle equal to 2α with the direction of the beam 27; the beam 29, which has passed through the system 19, 17, 21, is thus focussed at a point 30 distinct from the point 28.

In accordance with the invention, the beam 29 can be selected by an opaque screen 31 which comprises only one passage of light at 30. The film 2 through which the light has passed three times, can be observed by placing the eye immediately behind the aperture in the screen 31. The beam 29 can however be passed through a lens 32 which forms the image of the film 2 in the plane 33, in which there may be arranged for example an observing screen or a photographic emulsion. In the same way, a beam can be selected which has effected a greater number of passages, for example 7.

The definition of the image of the film 2 which can be obtained becomes sharper as the successive points of passage of a ray of light through the film become closer together, which requires in particular that the angle α should be given a small value; it is clear that in this case the separation of the images 28, 30 and following, will only be complete if the width of the aperture of the diaphragm 23 in the plane of the drawing is sufficiently small. It is then desirable to give the aperture 30 in the screen 31 a greater surface area than that of an image of the source in such manner that the solid angle by which is observed this aperture of a point of the film is not too small, and that the definition of the image of the film is not thereby limited, due to the phenomena of diffraction.

This aperture 30 may for example take the form shown in Fig. 5, that is to say it may be constituted by a substantially circular aperture 30' into which project at least one opaque portion 63, the surface area of which is such that it covers the adjacent images of the image 64 which it is desired to select, at least on the side at which these images have the greatest light intensity.

In the arrangement shown in Fig. 3, the divergent beam 34, emitted by the virtual point source 35, is converted by the concave mirror 36 to a beam 1 which is convergent at the point 37. The reflecting layers 38 and 39 (formed in the same way as already explained with reference to the layer 5 of Fig. 1) have respectively a radius of curvature, the length of which is equal to their distance from the point 37. The axis of the layer 38 is coincident with the optical axis of the beam 1, whilst the axis of the layer 39 forms a small angle with it. The rays of the beam 1 reflected by the layers 38 and then 39, which then pass through the layer 38, form a beam 40 which is focussed at a point 41 at which it forms an image of the source 34, separate from that formed at 37 by the direct rays.

There can thus be obtained by means of a small concave mirror 43 an image in the plane 42 of the film 2 through which the light has passed three times. For the same reasons as those previously explained with respect to the aperture 30 of the screen 31, the mirror 43 may have a surface area substantially greater than that of the image which it is desired to select, the said mirror then being provided either with at least one superficial mask, or at least one notch corresponding to the opaque portion 63 of the screen shown in Fig. 5.

It is only necessary to displace the mirror 43 in order to obtain in the same way the images of the film 2 produced by light which has for example passed five or seven times through the film.

In the example shown in Fig. 4, the divergent beam emitted from the practical point source 44 is converted by the lens 45 to a parallel beam 1. The semi-reflecting layers 46 and 47, between which the film 2 is placed, are arranged on the flat sheets of glass 48 and 49 with parallel faces, which form angles $$\frac{\beta}{2}$$

and $\beta$ respectively with a plane at right angles to the optical axis of the beam 1.

The emergent rays 50, 51, 52, etc., which have respectively passed through the film 2 once, three times, five times, etc., form angles 0, $\beta$, 2$\beta$, etc. respectively with the optical axis of the beam. The layers of air 54 and 57 are respectively comprised between the pairs of flat sheets of glass with parallel faces 53, 55 and 56, 58. The space 59 is filled with a transparent liquid having the same index of refraction as the sheets of glass. Each of the assemblies 53, 54, 55 and 56, 57, 58 is pivotally mounted about an axis at right angles to the plane of the drawing.

In order to permit the beam, which has for example passed three times through the film 2, to pass to the receiver, the orientation of the assembly 53, 54, 55 is adjusted in such manner that every ray which makes an angle greater than $\beta$ with the optical axis of the beam 1 is totally reflected on the surface of contact of the sheet 53 with the layer of air 54, and the orientation of the assembly 56, 57, 58 is adjusted in the same way so that every ray making an angle less than $\beta$ with the optical axis of the beam 1 is totally reflected on the surface of contact of the sheet 56 with the layer of air 57. Thus, only a part of the rays which have passed three times through the film 2 will reach the receiver. In the same way, the beams may be selected which have passed through the film once, five times or more.

The lens 60 gives an image of the film 2 in the plane 61 and one (or a number) of images of the source 44 in the plane 62. As movable screen may be arranged in the plane 62 in order to facilitate the adjustment of orientation of the assemblies 53, 54, 55 and 56, 57, 58.

These devices may obviously give rise to various combinations and alternative arrangements. Thus, in the example of Fig. 2, the lens 32 could be placed between the assembly 19, 17, 21, and the screen 31; in this case, the lens 21 may be dispensed with if the diameter of the lens 32 is sufficient to receive all the emergent parallel beams.

The simple lens 22 may in practice be replaced by a corrected achromatic lens, or may even be replaced by a lens placed at a certain distance from the semi-reflecting layer 18.

In a very general way, the devices described above may be modified, without thereby departing from the scope of the invention. The invention can be applied in cases in which the objects to be studied have additive optical properties under the conditions considered, that is to say especially: absorption, reflection, natural or induced bi-refringence, magnetic rotating power.

It may be applied in particular:

To the observation and to the printing of underexposed photographic films and plates;

To the study by visible or invisible light of preparations having only slight contrast;

To micro-photometry;

To the colorometry of very pale shades;

To the measurement of photo-elasticity;

To the measurement of magnetic rotating power;

To the checking of optical members; the object studied may, in certain cases replace one of the reflecting surfaces; this is the case for example of the checking of a treatment of a reflecting surface.

The reflecting layers may also be arranged on the faces of the object studied; this is the case for example of the observation of colorations produced in certain substances by bombardment with electrons.

This list of applications is given by way of indication only and not in any restrictive or limiting sense.

What I claim is:

1. An apparatus for increasing the optical contrast of objects which can be viewed by transparency, comprising a substantial point source of light for illuminating the object to be observed, first and second semi-reflecting surfaces disposed at a very small angle to each other, first and second optical lenses combined respectively with said first and second semi-reflecting surfaces, means for disposing said object between and in close spatial relationship with said surfaces, such that the entrant rays from said source pass substantially parallel to each other from the first said lens through said object, the emergent rays from the second said lens being focused in a plane, whereby the beams which have been subjected to different numbers of reflections by said first and second surfaces are focused at separate points in said plane, and means for selecting for observation that beam which has passed through said object the desired number of times to obtain the desired contrast.

2. An apparatus for increasing the optical contrast of objects which can be viewed by transparency according to claim 1, wherein said last named means comprise means for eliminating those beams having different points of convergence from the selected beam.

3. An apparatus for increasing the optical contrast of objects which can be viewed by transparency according to claim 1, wherein said last named means comprise optical means to vary the direction of the selected beam.

4. An apparatus for increasing the optical contrast of objects which can be viewed by transparency according to claim 1, wherein said last named means comprise means for eliminating beams having their optical axes on each side of the optical axis of the selected beam.

5. An apparatus for increasing the optical contrast of objects which can be viewed by transparency according to claim 4, wherein said last named means are total reflection devices.

6. A method of increasing the optical contrast of objects which can be viewed by transparency, comprising the steps of: illuminating the object to be observed from a single substantially point source of light; disposing said object between and in close spatial relation with first and second semi-reflecting surfaces forming a very small angle with each other; combining said first and second surfaces with a first and second optical lens respectively, such that the entrant rays pass substantially parallel to each other from the first said lens through said object, the emergent rays from the second said lens being focused in a plane, whereby the beams which have been subjected to different numbers of reflections by said first and second surfaces are focused at separate points in said plane; and selecting that beam which has passed through said object the desired number of times to obtain the desired contrast, by eliminating the other beams by means adapted to act on beams having different points of convergence.

7. A method of increasing the optical contrast of objects which can be viewed by transparency, comprising the steps of: illuminating the object to be observed from a single substantially point source of light; disposing said object between and in close spatial relation with first and second semi-reflecting surfaces forming a very small angle with each other; combining said first and second surfaces with a first and second optical lens respectively, such that the entrant rays pass substantially parallel to each other from the first said lens through said object, the emergent rays from the second said lens being focused in a plane, whereby the beams which have been subjected to different numbers of reflections by said first and second surfaces are focused at separate points in said plane; and selecting that beam which has passed through said object the desired number of times to obtain the desired contrast, by varying the direction of the selective single beam by means of an optical device.

8. A method of increasing the optical contrast of objects which can be viewed by transparency, comprising the steps of: illuminating the object to be observed from a single substantially point source of light; disposing said object between and in close spatial relation with first and second semi-reflecting surfaces forming a very small angle with each other; combining said first and second surfaces with a first and second optical lens respectively, such that the entrant rays pass substantially parallel to each other from the first said lens through said object, the emergent rays from the second said lens being focused in a plane, whereby the beams which have been subjected to different numbers of reflections by said first and second surfaces are focused at separate points in said plane; and selecting that beam which has passed through said object the desired number of times to obtain the desired contrast, by eliminating those beams which have their optical axes located on each side of the optical axis of the desired beam.

9. A method as claimed in claim 8, in which the undesired beams are eliminated by selective total reflection devices mounted in the path of the emergent parallel beam.

References Cited in the file of this patent
UNITED STATES PATENTS

| | | |
|---|---|---|
| 2,131,501 | Dimmick | Sept. 27, 1938 |
| 2,131,738 | Hoyt | Oct. 4, 1938 |
| 2,232,177 | Ide | Feb. 18, 1941 |
| 2,641,963 | Carter | June 16, 1953 |
| 2,783,678 | Andreas | Mar. 5, 1957 |